(12) United States Patent
Farley et al.

(10) Patent No.: US 12,346,704 B1
(45) Date of Patent: Jul. 1, 2025

(54) DYNAMIC VEHICLE DATA LOGGER CONFIGURATION

(71) Applicant: Rivian IP Holdings, LLC, Irvine, CA (US)

(72) Inventors: Caden Sheng Farley, Laguna Hills, CA (US); Mayur Madhukar Jadhav, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/592,374

(22) Filed: Feb. 29, 2024

(51) Int. Cl.
  *G06F 9/445* (2018.01)
  *G06F 11/30* (2006.01)
  *G06F 11/34* (2006.01)

(52) U.S. Cl.
  CPC ...... *G06F 9/44505* (2013.01); *G06F 11/3013* (2013.01); *G06F 11/3051* (2013.01); *G06F 11/3476* (2013.01)

(58) Field of Classification Search
  CPC ............. G06F 9/44505; G06F 11/3013; G06F 11/3051; G06F 11/3476
  USPC ............................................................ 713/2
  See application file for complete search history.

(56) References Cited

U.S. PATENT DOCUMENTS

| | | | | |
|---|---|---|---|---|
| 4,720,782 A * | 1/1988 | Kovalcin | ............ | G06F 11/3055 700/83 |
| 4,926,495 A * | 5/1990 | Comroe | ................ | H04W 84/08 709/224 |
| 5,819,042 A * | 10/1998 | Hansen | .................... | H04L 41/22 709/222 |
| 5,999,180 A * | 12/1999 | Coskrey, IV | ........... | G06F 9/452 715/810 |
| 6,208,640 B1 * | 3/2001 | Spell | .................. | H04Q 11/0457 370/468 |
| 6,285,955 B1 * | 9/2001 | Goldwasser | ........... | G01D 9/005 702/6 |
| 7,518,396 B1 * | 4/2009 | Kondapalli | ...... | H03K 19/17758 326/38 |
| 8,417,391 B1 * | 4/2013 | Rombouts | .............. | G05B 13/02 700/297 |
| 9,569,795 B1 * | 2/2017 | Shin | .................... | G06Q 30/0201 |
| 10,075,385 B1 * | 9/2018 | Thompson | .......... | G06F 9/45504 |
| 10,812,589 B2 * | 10/2020 | Thomas | ................... | G06F 16/22 |
| 2002/0100017 A1 * | 7/2002 | Grier | ........................ | G06F 8/71 717/121 |
| 2003/0061320 A1 * | 3/2003 | Grover | ................ | H04L 61/5007 709/222 |
| 2004/0193745 A1 * | 9/2004 | Olbricht | ................ | G06F 3/1204 710/16 |
| 2005/0164375 A1 * | 7/2005 | Inoue | ................... | G01N 21/534 435/287.2 |

(Continued)

*Primary Examiner* — Paul R. Myers
(74) *Attorney, Agent, or Firm* — BAKERHOSTETLER

(57) ABSTRACT

Aspects of the subject disclosure relate to updating data logging configurations on a vehicle. A device implementing the subject technology may include a processor configured to receive a data logger configuration containing one or more data logging factors that indicates one or more data streams to be logged when the one or more data logging factors are satisfied. The processor is also configured to replace an existing data logger configuration with the received data logger configuration. The processor is also configured to determine that the one or more data logging factors have been satisfied, and log the one or more data streams.

20 Claims, 5 Drawing Sheets

(56) References Cited

U.S. PATENT DOCUMENTS

| | | | | |
|---|---|---|---|---|
| 2005/0198401 A1* | 9/2005 | Chron | H04L 12/413 | 709/217 |
| 2005/0222732 A1* | 10/2005 | Robertson | B60J 5/103 | 340/426.24 |
| 2005/0223227 A1* | 10/2005 | DeLeeuw | H04L 41/0869 | 713/168 |
| 2006/0039340 A1* | 2/2006 | Ptasinski | H04W 8/22 | 370/338 |
| 2006/0206272 A1* | 9/2006 | Miller | G01N 27/626 | 702/24 |
| 2006/0268829 A1* | 11/2006 | Nedeltchev | H04L 41/0869 | 370/352 |
| 2006/0271772 A1* | 11/2006 | Woundy | H04N 21/4432 | 713/1 |
| 2007/0011334 A1* | 1/2007 | Higgins | G06F 11/3604 | 709/227 |
| 2007/0038342 A1* | 2/2007 | Grana | G07C 5/008 | 73/114.61 |
| 2007/0263549 A1* | 11/2007 | Brinkley | H04L 41/12 | 370/252 |
| 2008/0270469 A1* | 10/2008 | Myerson | G06F 11/3476 | |
| 2009/0119038 A1* | 5/2009 | Bell, Jr. | G01R 31/3648 | 702/62 |
| 2009/0191513 A1* | 7/2009 | Wang | G09B 9/052 | 434/69 |
| 2009/0310485 A1* | 12/2009 | Averi | H04L 43/106 | 370/232 |
| 2010/0131351 A1* | 5/2010 | Kazan | G06F 8/70 | 705/14.42 |
| 2010/0149636 A1* | 6/2010 | MacNaughton | H04N 13/398 | 359/477 |
| 2010/0169154 A1* | 7/2010 | Kraft | G06Q 30/0601 | 703/22 |
| 2011/0029665 A1* | 2/2011 | Wenig | H04L 67/01 | 709/224 |
| 2011/0072119 A1* | 3/2011 | Bronstein | H04L 41/082 | 709/222 |
| 2011/0078620 A1* | 3/2011 | Chiou | G06K 7/10722 | 718/100 |
| 2011/0258433 A1* | 10/2011 | Pulini | H04L 63/20 | 713/153 |
| 2013/0013123 A1* | 1/2013 | Ozaki | G06Q 10/06 | 700/295 |
| 2013/0317993 A1* | 11/2013 | Wasserman | G06Q 30/016 | 705/304 |
| 2013/0318529 A1* | 11/2013 | Bishop | G06F 11/3048 | 718/100 |
| 2014/0149079 A1* | 5/2014 | Shin | G06K 19/0717 | 702/187 |
| 2014/0211931 A1* | 7/2014 | Wendt | H04M 3/5175 | 379/265.03 |
| 2014/0250425 A1* | 9/2014 | Kumar | G06F 11/3072 | 717/121 |
| 2015/0288495 A1* | 10/2015 | Tiirola | H04W 74/08 | 370/329 |
| 2015/0307042 A1* | 10/2015 | Kurtz | B60R 16/03 | 307/10.1 |
| 2015/0317363 A1* | 11/2015 | Manzano Macho | G06F 16/284 | 706/12 |
| 2016/0109267 A1* | 4/2016 | Munoz | E21B 47/24 | 324/207.18 |
| 2016/0241666 A1* | 8/2016 | Chapman | H04L 67/1097 | |
| 2016/0305793 A1* | 10/2016 | Neubecker | B60L 58/12 | |
| 2017/0337573 A1* | 11/2017 | Toprak | G06Q 10/20 | |
| 2017/0339011 A1* | 11/2017 | Condeixa | H04L 67/1097 | |
| 2018/0285300 A1* | 10/2018 | Prentice | G06F 13/1694 | |
| 2019/0080602 A1* | 3/2019 | Rice | B60H 1/0073 | |
| 2019/0230169 A1* | 7/2019 | Elangovan | G06F 9/547 | |
| 2019/0383135 A1* | 12/2019 | Hill, III | G06F 1/3206 | |
| 2020/0183387 A1* | 6/2020 | Heit | G05D 1/0088 | |
| 2020/0272745 A1* | 8/2020 | Bott | H04L 9/3247 | |
| 2020/0320084 A1* | 10/2020 | Goto | G06F 16/24568 | |
| 2020/0402158 A1* | 12/2020 | Tsourkis | G06Q 30/0278 | |
| 2021/0394800 A1* | 12/2021 | Kwak | G07C 5/0808 | |
| 2022/0180724 A1* | 6/2022 | Avery | G08B 21/20 | |
| 2022/0317918 A1* | 10/2022 | Golov | G06F 3/0656 | |
| 2022/0335809 A1* | 10/2022 | Shannon | G06Q 50/265 | |
| 2022/0337926 A1* | 10/2022 | Liu | G06F 3/0688 | |
| 2023/0254312 A1* | 8/2023 | She | G06F 21/629 | 726/4 |

* cited by examiner

DYNAMIC VEHICLE DATA LOGGER CONFIGURATION

INTRODUCTION

This application generally relates to logging systems in a movable apparatus, such as a vehicle. A data logger configuration can be updated to specify various data logging factors, which when satisfied, cause one or more data streams to be logged. The data logger configuration can be replaced by an updating process to change the data logging factors which trigger the logging of the data streams.

SUMMARY

Vehicle management can include logging data from various sensors when those sensors create a condition which is pertinent to one or more vehicle systems. For example, one such system is the advanced driver assistance system which can provide the driver with warnings based on various sensor data. In an effort to make sure these systems are ever-improving and functioning as they ought, developers can retrieve logged data surrounding the events which trigger the advance driver assistance system. The needs surrounding these logged events can change based on the vehicle use, the vehicle location, the vehicle model, and so forth. The ability to update the parameters and configurations surrounding the logging of such data may be important in order to ensure that relevant and/or useful data is being collected. Typically, system updates to vehicles are rare. Vehicles operate in a highly regulated industry and often must account for the rules and regulations across many different legal jurisdictions. As such, updates are typically only available periodically and spaced relatively far apart from each other. This leads to longer development cycles and possible developer frustration in having to work with either stale data or data that is not quite what is needed, or ideal. The subject technology includes a way to update the logging configuration of a vehicle on an as-needed basis, targeting updates to certain vehicles based on, for example, location, weather conditions, climate, vehicle models, sub-models, variants, or other factors, so that developers can receive more relevant logging information in a timely fashion.

The logging configuration may be related to energy consumption, energy efficiency, or vehicle battery usage of the vehicle which data can be used to implement energy savings technologies for the reduction of carbon dioxide in the atmosphere. For example, the logging configuration may include logging data related to the battery pack efficiency, regenerative braking, or energy consumption during events. System developers can use this data to alter the vehicle systems discussed herein to provide more energy efficient results for vehicle usage. In addition, energy consumption can be reduced by logging or uploading logged data in a manner utilizing less energy for data storage and transmission by reducing the amount of logged data in instances where the logged data is not needed. Utilizing less energy in logging processes has a direct positive impact on climate change by reducing energy consumption overall.

In accordance with one or more aspects of the disclosure, a method may include receiving, at a first device, such as a vehicle, and from a server, a data logger configuration including one or more data logging factors that indicates one or more data streams to be logged when the one or more data logging factors are satisfied. The method may also include replacing, at the first device, an existing data logger configuration with the received data logger configuration, where replacing the existing data logger configuration with the received data logger configuration alters operation of the first device. The method may further include determining, at the first device, that the one or more data logging factors have been satisfied. In addition, the method may include responsive to determining that the one or more data logging factors have been satisfied, logging the one or more data streams.

In accordance with one or more aspects of the disclosure, a system may include a memory and at least one processor where the processor may be configured to receive, at a first device and from a server, a data logger configuration including one or more data logging factors that indicates one or more data streams to be logged when the one or more data logging factors are satisfied. The processor may also be configured to replace, at the first device, an existing data logger configuration with the received data logger configuration, where replacing the existing data logger configuration with the received data logger configuration alters operation of the first device. The processor may also be configured to determine that the one or more data logging factors have been satisfied. In addition, the processor may also be configured to, responsive to determining that the one or more data logging factors have been satisfied, log the one or more data streams.

In accordance with one or more aspects of the disclosure, a method may include receiving a request for a data logger configuration, the request including a configuration identifier (ID) of the requested data logger configuration and a target vehicle indication, the data logger configuration indicating one or more data streams to be logged when one or more data logging factors is satisfied, where at least one of the one or more of the data logging factors is associated with a vehicle sensor. The method may also include retrieving the data logger configuration from a firmware repository based on the configuration ID. The method may further include pushing the data logger configuration to one or more target vehicles based on the target vehicle indication, where the data logger configuration causes the one or more target vehicles to collect data based on the data logger configuration, the data including information related to the vehicle sensor for each of the one or more target vehicles.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
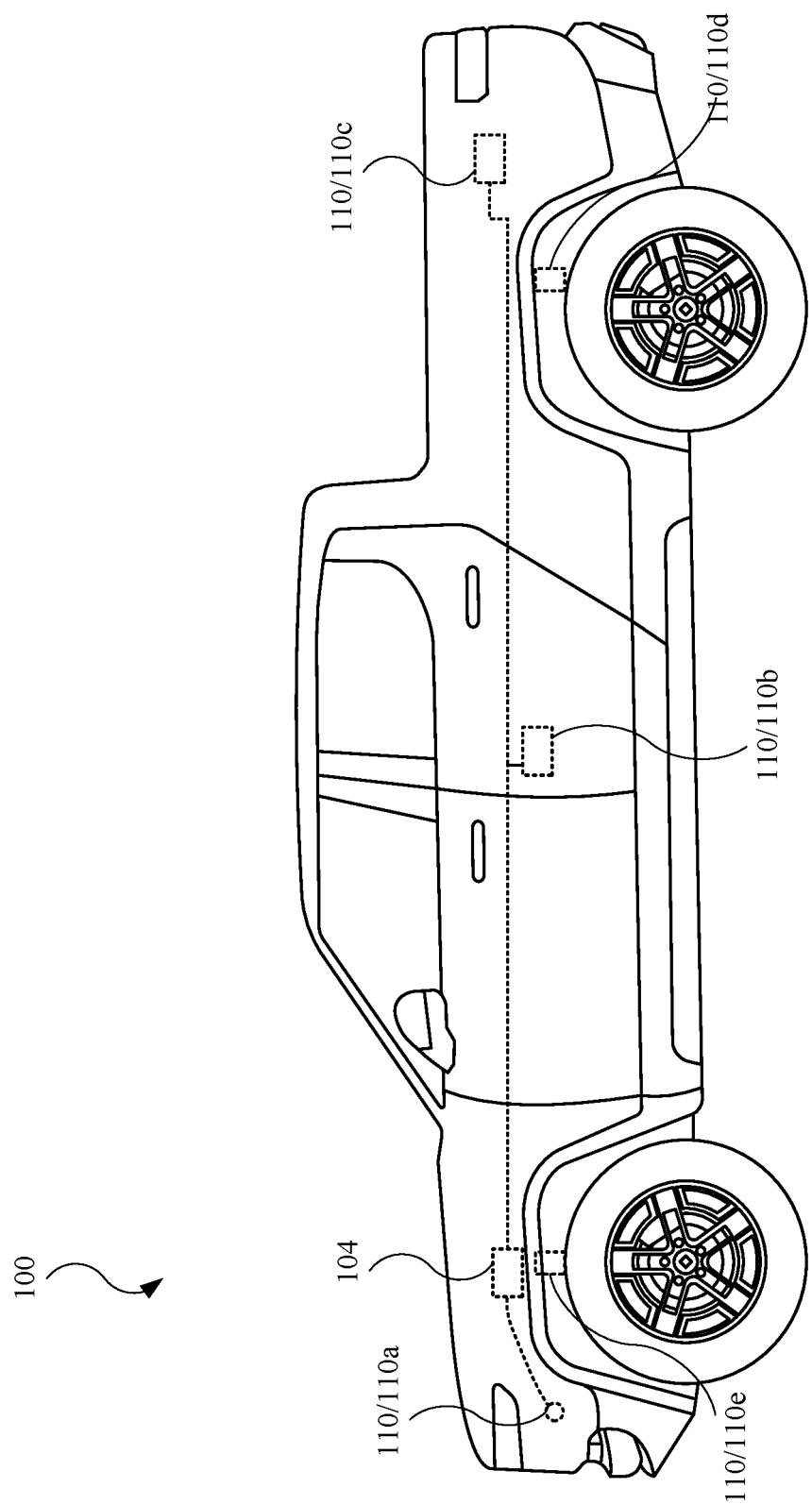
FIG. 1 illustrates a schematic perspective side view of an example implementation of a vehicle in accordance with one or more implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

An Advanced Driver Assistance System (ADAS) provides alerting and assisting features for drivers. The ADAS of a vehicle utilizes sensor inputs, control systems, and alerting systems to assist drivers to help avoid crashes, maintain safe distances, maintain lane control, avoid hitting objects or people, and so forth. Developers may be constantly trying to improve these systems to provide additional features or improved features of these systems.

Part of the ADAS is an ADAS data recorder (ADR) logger application (or "ADR Logger") that supports dynamic data logging factors or "triggers" to log sets of data streams based on certain events that occur in, and/or are indicated by, the input signals, such as sensor inputs. Each dynamic trigger is defined by the logic used to determine when the trigger is activated and the data streams that are consequentially logged. The logic for every trigger may be stored in a script that the ADR Logger executes periodically, such as at a frequency between 1 Hz to 200 Hz, such as between about 50 Hz and 150 Hz, for example, 100 Hz, though it should be appreciated that other frequencies may be used. Any active triggers are retrieved upon execution and the corresponding data streams associated with the triggers are logged/stored. The data streams may each include output sensor data streamed to the ADR Logger for each available sensor in a pre-defined format. In some instances, a data stream can include more than one sensor output, such as when a separate device collects sensor data for multiple sensors and provides reporting for each of several separate sensors.

The ADR Logger includes a configuration or profile that defines the script for the triggers as well as specifications for the data streams, such as pre-defined data structures established to record output from each available sensor in an appropriate format which may be individualized for each sensor. The configuration for the ADR Logger can be updated to change the script for the triggers and/or the specifications for the data streams. For example, a software update to the ADAS and other vehicle systems can include an update to the ADR Logger configuration. Vehicle software updates may generally be made infrequently.

The subject technology, however, provides a mechanism for updating the ADR Logger configuration as needed, without waiting for vehicle software updates. The subject technology also provides a way of rolling out new ADR Logger configurations and managing the existing ADR Logger configurations for various specified vehicles. Although a vehicle is specifically referenced herein, the ADR Logger of the subject technology can be implemented in any movable apparatus.

According to some embodiments, for example as shown in FIG. 1, an example implementation of a movable apparatus takes the form of a vehicle 100. In some embodiments, the vehicle 100 is a sport utility vehicle. In the embodiment shown in FIG. 1, the vehicle 100 is a truck. Generally, the vehicle 100 may take the form of any motorized vehicle, including motorized vehicles with an internal combustion engine and/or one or more electric motors. In this regard, other implementations of the vehicle 100 may include land-based vehicles, such as a car (e.g., sedan, hatchback), a van, a motorcycle, a motorized scooter, or a commercial truck, as non-limiting examples. Still further, other implementations of the vehicle 100 may include sea or air transport vehicles, planes, helicopters, submarines, boats, or drones, as non-limiting examples.

The vehicle 100 includes a vehicle management system 104 designed to provide various functions such as the ADAS and the ADS Logger, among other functions. The vehicle management system 104 may include one or more processors and memory and may be coupled (e.g., communicatively coupled by wire or wirelessly) directly or indirectly to one or more sensors 110, e.g., sensors 100a-e, of the vehicle 100. The one or more sensors 110 of the vehicle 100 can provide input signals to the vehicle management system 104. These signals can be used by an ADR Logger running on the vehicle management system 104 to provide logging based on whether the data logger conditions (e.g., triggers) are met. The one or more sensors 110 may include, for example, accelerometers, cameras, inertial measurement units, microphones, gyroscopes, magnetometers, barometers, distance measuring devices, radar, lidar, and the like. Sensors 110 may be located at various places throughout the vehicle 100, such as at a front sensor 110a location, a side sensor 110b location, a rear sensor 110c location, a rear wheel sensor 110d location, or a front wheel sensor 110e location, and so forth. It should be understood that these are just examples, and that sensors may located at any place on the vehicle 100, such as within the engine or motor compartment, battery pack (if so equipped), within the passenger compartment, and so forth.

In some embodiments, the vehicle 100 may be an electric vehicle and may include a battery pack (not shown in FIG. 1) which may include one or more battery modules or may have a cell-to-pack configuration. The battery cells of the battery pack may include rechargeable battery cells. The vehicle 100 may include a chassis (not shown in FIG. 1) used to support the battery pack and various other components (not shown in FIG. 1) of the vehicle 100, such as the suspension and differential, as non-limiting examples. The battery pack may couple to one or more drive units which may include, for example, a motor, an inverter, a gear box, and a differential. In some embodiments, the one or more drive units may include one or more internal combustion engines. In other embodiments, the one or more drive units may include one or more electric motors. In such embodiments, the one or more drive units can use energy (e.g., electrical energy) stored the battery pack for propulsion to drive (e.g., rotationally drive) the front wheels and the rear wheels, respectively.

The subject technology addresses a problem related to the management of data collection configuration management. Although this collection of data is described in terms of the ADAS and an ADS Logger, it should be understood that the principals discussed herein with respect to the ADS Logger may be applied also to other logging systems of the vehicle 100.

Figure 2:
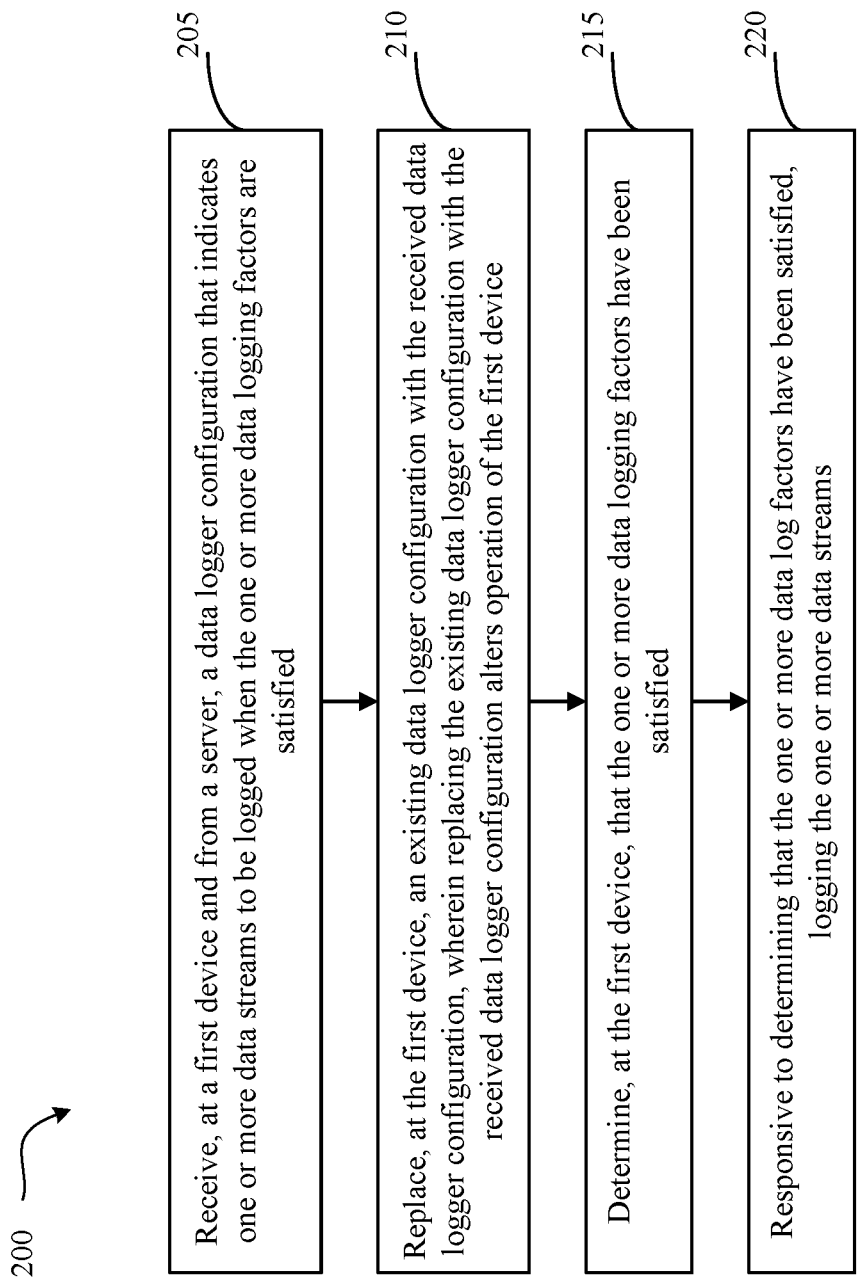
FIG. 2 illustrates a flow diagram of an example process for receiving and replacing a data logger configuration for a data logger, in accordance with one or more implementations of the subject technology.

FIG. 2 illustrates a flow diagram 200 for receiving and replacing a data logger configuration and evaluating data logging factors for logging data streams associated with the data logging factors. In particular, the flow diagram 200 may be used to manage and utilize a configuration of the vehicle for logging data associated with the ADAS. Further, the flow diagram 200 may be implemented by a vehicle management system shown and/or described herein. For explanatory purposes, the flow diagram 200 is primarily described herein with reference to the ADAS and ADR Logger of vehicle 100 of FIG. 1, and/or various components thereof. However, the flow diagram 200 is not limited to the ADAS of vehicle 100 of FIG. 1 and is not limited to the vehicle 100 of FIG. 1, and one or more blocks (or operations) of the flow diagram 200 may be performed by one or more other structural components of the vehicle 100 and/or of other suitable moveable apparatuses, devices, or systems. Further, for explanatory purposes, some of the blocks of the flow diagram 200 are described herein as occurring in serial, or linearly. However, multiple blocks of the flow diagram 200 may occur in parallel. In addition, the blocks of the flow diagram 200 need not be performed in the order shown and/or one or more blocks of the flow diagram 200 need not be performed and/or can be replaced by other operations.

As shown in FIG. 2, flow diagram 200 may include, at 205, receiving, at a device and from a server, a data logger configuration that indicates one or more data streams to be logged by an ADR Logger application when the one or more data logging factors are satisfied. In some implementations, the device may be the vehicle or a component of the vehicle, such as the vehicle management system, electronic control unit, and/or one or more processors which may be associated therewith. The server may be a server that can communicate remotely with the first device, for example, over a wired or wireless network, such as WiFi, a cellular network, or a telematics network, and the server having access to various data logger configurations. The server, for example, may be under the control of the vehicle manufacturer and may store data logger configurations and provide updated data logger configurations to the vehicle from time to time.

The data logger configuration is a logging profile which includes a set of defined data logging factors (i.e., triggers), which when satisfied, cause specified data streams to be logged. The data logger configuration can include one or more data logging factors in any appropriate format. The format, for example, can indicate sets of sensors and corresponding sensor values, which when satisfied according to a specified logic, causes the logging of one or more data streams. In some implementations, the format may include a script file with integrated data logging factors such that the script file can be natively executed by the vehicle management system. In some implementations, the format may include a format other than a script file that defines logic conditions for the data logging factors such that the logic conditions can be interpreted by the ADR Logger application to check if the logic conditions are satisfied. In some implementations, the format of the data logger configuration may include, in addition to a script file or other logic file, a data stream configuration file that pre-defines the available data streams which can be specified to be logged. For example, the data stream configuration file can define one or more communication channels between the various sensors and the ADR logger.

In some implementations, the device may already have an existing data logger configuration saved in the vehicle. The existing data logger configuration, for example, may be stored in the ADR logger application. In some implementations, the data logger configuration may be received at the vehicle when the vehicle is in use or at rest. If the vehicle is in use by an operator, in some implementations, the data logger configuration can be received at the vehicle and used to replace an existing configuration when the vehicle is at rest or when the existing configuration can be otherwise replaced safely. In some embodiments, the data logger configuration may be received at the vehicle only when the vehicle is not in use, such as while the engine is turned off. For example, as a safety precaution, an update to the data logger configuration may only be provided to the vehicle or applied by the vehicle when the vehicle is not in use.

The received data logger configuration can be received based on a status of the vehicle, a status of a person associated with the vehicle, or a status of a condition surrounding the vehicle. For example, the received data logger configuration may be received based on the particular manufacturer, model, and/or year of the vehicle. In another example, the received data logger configuration may be received based on the geographic location of the vehicle or based on a legal jurisdiction of the vehicle. For example, all vehicles in a particular state or country may receive a particular data logger configuration. Or in another example, all vehicles in a set of zip codes may receive a particular data logger configuration. Or in another example still, all vehicles within a geofenced area based on Global Positioning System (GPS) data may receive a particular data logger configuration. The received data logger configuration may be received based on a demographic category for a person associated with the vehicle, such as the registered vehicle owner, a driver profile, and the like. The received data logger configuration may be received based on a weather forecast, on current weather conditions, or on the climate zone for where the vehicle is.

In an implementation, the existing data logger configuration may include a first data logging factor whereas the received data logger configuration does not include the first data logging factor or includes a first data logging factor such that the conditions of the data logging factor are met less frequently to trigger a logging event. Thus, after replacing the data logger configuration, as described below, the logged one or more data streams no longer includes at least some data related to the first data logging factor, whereas before replacement, the logged one or more data streams for the existing data logger configuration included additional data related to the first data logging factor.

While logged data may be important, it is also the case that system developers may want to reduce the amount of data received when it is not determined to be relevant. The subject technology allows system developers to alter the logging configurations easily and without having to wait until a software update for the vehicle. As such, memory, data transfer bandwidth, and energy are saved by the ability to more quickly add, remove, or modify data logging factors in a data logger configuration. Implementations may also add new data logging factors or modify existing data logging factors to result in additional logged data. Because system developers can gain access to additional needed data quickly and easily without waiting for a software update, the development cycle can be reduced by eliminating lag time waiting for the next software update. Thus, the received data logger configuration can include a data logging factor not included in the existing data logger configuration or the received data logger configuration can include a modified data logging factor such that the data received is more useful than the data from the existing data logger configuration.

In some implementations, the one or more data logging factors may be related to energy consumption, energy efficiency, or vehicle battery usage of the vehicle. For example, the data logging factors may include data related to the battery pack efficiency, regenerative braking, or energy consumption during ADAS related events which may trigger the ADR Logger application to log one or more data streams. System developers can use this data to alter the ADAS to provide more energy efficient results. In addition, energy consumption can be reduced by logging or uploading logged data in a manner utilizing less energy for data storage and transmission by reducing the amount of logged data in instances where the logged data is not needed. Utilizing less energy in logging processes has a direct positive impact on climate change by reducing energy consumption overall.

At 210, upon receiving the data logger configuration, the existing data logger configuration can be replaced with the received data logger configuration. In some implementations, replacing the data logger configuration can include loading the data logger configuration in memory and restarting the ADR Logger application to read from the new data logger configuration. In some implementations, the data logger configuration is only received when the vehicle is not in use so that the server from which the data logger configuration is received may first query a status of the vehicle, and then only deliver the data logger configuration when it would be safe to restart the ADR Logger application, such as when the vehicle is not in use. In some implementations, the data logger configuration can be received by the vehicle while the vehicle is in use and acted upon later, when the vehicle is not in use, for example, when the vehicle boots up or comes back from a sleep state or other inactive state. In other implementations, replacing the data logger configuration can include replacing the existing data logger configuration without restarting the ADR Logger application. In such implementations, for example, the ADR Logger application may periodically reload the data logger configuration data from a stored location. Thus, replacing the data logger configuration can include replacing the existing data logger configuration in the stored location and waiting until the ADR Logger application reloads the data logger configuration data. In implementations where the logger application is restarted, restarting the logger application may be configured to occur only when the vehicle is detected to be in a safe state so that if restarting the logger application caused a problem with vehicle operation, risk to the vehicle operator would be minimized. For example, the ADR Logger application may only be restarted when the vehicle is in a parked state such as with a drive selector of the vehicle in "Park" or the like. Thus, the data logger configuration may be replaced without interrupting operation of the vehicle.

In some implementations, a version identifier of the existing data logger configuration is checked against a version identifier of the received data logger configuration. If the version identifiers are the same, then the received data logger configuration may be rejected by the ADR Logger application and an indication of the rejection included in the logging data. If the version identifiers are different, then the received data logger configuration may be accepted by the ADR Logger application and applied in due course, as described above. The version identifier may be based on a hash of the data logger configuration. The version identifier may be provided by the server and compared with the version identifier stored with the existing data logger configuration. In some implementations, the version identifier for the received data logger configuration and the version identifier for the existing data logger configuration may be calculated at the vehicle and compared to determine if the received data logger configuration is different from the existing data logger configuration.

At 215, the flow diagram 200 may include determining, at the device, that the one or more data logging factors have been satisfied. The ADR Logger application, for example, may execute a script associated with the data logging factors that compares sensor input data to a set of conditional values to determine that the conditional values are satisfied. For example, the script associated with the data logging factors can specify that if an first sensor is reporting a first value and the first value falls within a first range and that if a second sensor is reporting a second value and the second value falls within a second range, then the ADR Logger application should log data streams for the first sensor, the second sensor, and a third sensor. Thus, the data logging factors may specify, not only the conditions which are monitored which trigger a logging event, but also define the logging action to be taken.

At 220, the flow diagram 200 may include, responsive to determining that the one or more data logging factors have been satisfied, logging the one or more data streams. The data streams in question can be grouped together in a pre-defined data structure to simplify the logging associated with each of the identified data streams. In such implementations, continuing the example of the first sensor and second sensor above, the ADR Logger application can log a first data structure which specifies the first sensor data, the second sensor data, and the third sensor data. In some implementations, the third sensor data can relate to a sensor associated with a vehicle operator input, such as steering wheel position, accelerator pedal position, brake pedal position, seat position, mirror position(s), and so forth. In such implementations, the logged data can be used to determine operator feedback related to ADR Logging events. In some implementations, the third sensor data can relate to a sensor associated with conditions pertaining to the vehicle or roadway, such as speed, suspension travel, sway, tilt, lane detection, and so forth. In such implementations, the logged data can be used to determine interrelatedness of ADR Logging events.

In due course, after logging the one or more data streams into logged data, the device may provide the logged data to the server or to another server associated with the vehicle manufacturer and/or another authorized party. The data can be sent over a network, such as over a wireless network. The logged data can be analyzed to improve the ADAS. Or, if the logged data is for another system, the logged data can be analyzed to improve the other system.

Figure 3:
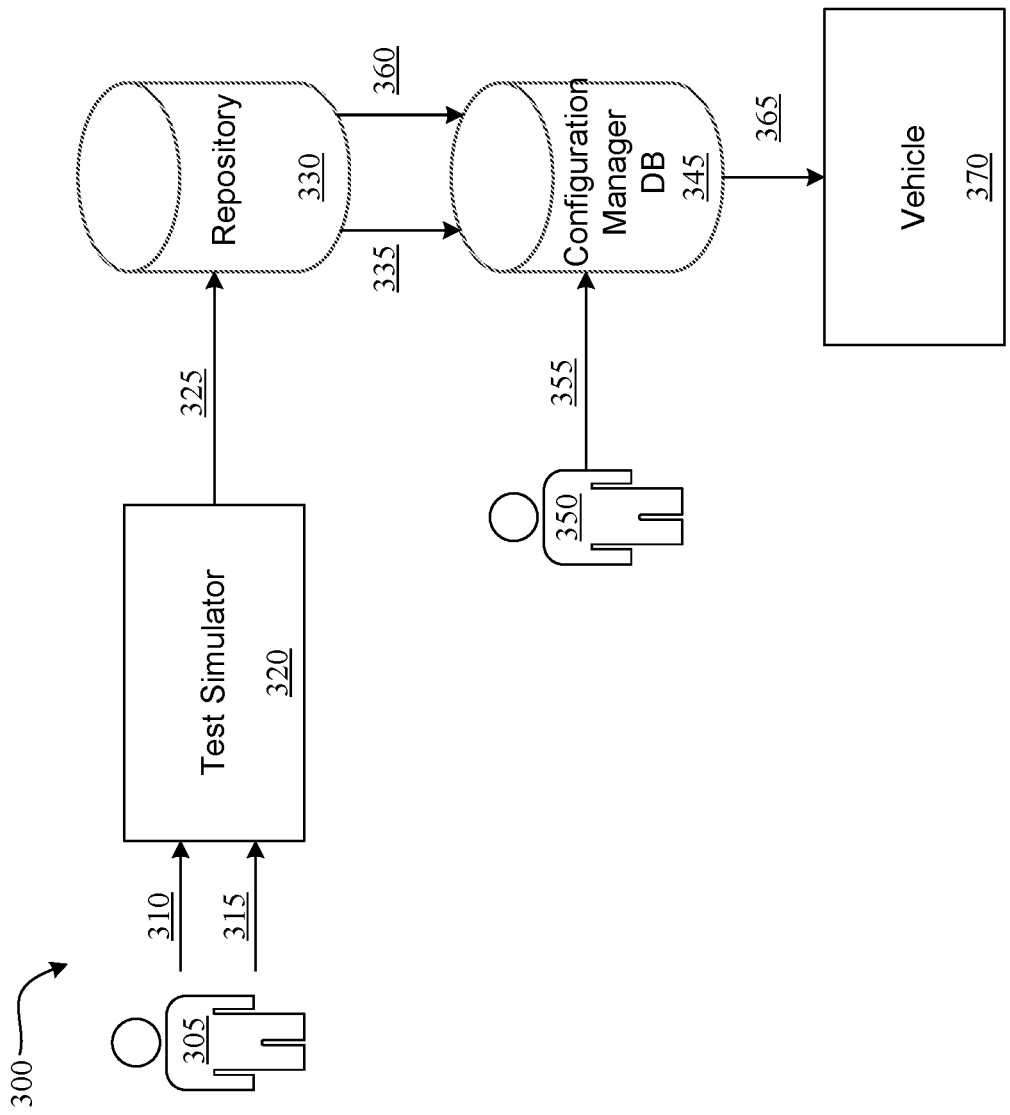
FIG. 3 illustrates a system flow diagram for generating, managing, and initiating replacement of a data logger configuration, in accordance with one or more implementations of the subject technology.

FIG. 3 illustrates a system flow diagram for a system 300 for generating, managing, and replacing data logger configurations in vehicles, in accordance with one or more implementations of the subject technology. In the system 300, a developer 305 for data logger configurations generates and provides a test data logger configuration 310 and a test profile 315 to a test simulator 320. Once the test data logger configuration 310 passes testing it will be stored and may eventually be sent to various vehicles through an update process, such as the flow diagram 200, described above. The test profile 315 includes information for test data streams and test sensor data for executing on the test simulator 320 to ensure that the test data logger configuration 310 does not cause any issues on real-world vehicles. The test sensor data for example may be used to test the test data logger configuration 310 for any unwanted behavior that could result, such as causing the data logger application to execute improperly or fail. In addition, the test sensor data can be used to test the test data logger configuration to determine whether the targeted data logging conditions or data logging factors execute as intended.

If the test data logger configuration 310 passes the testing, then it is sent as a valid or commit data logger configuration 325 to a data logger configuration repository 330. The data logger configuration repository 330 stores all the various data logger configurations that have been developed and tested. The data logger configurations may be customized to generate custom data logging as explained above. As a part of storing the valid data logger configuration 325 into the repository 330, a configuration ID 335 may be generated and sent to a configuration manager database (DB) 345 along with an optional configuration name or other metadata, such as date, developer, test data identifier, and so forth.

The configuration ID 335 may be generated by taking a hash of the data logger configuration 325, such as a cyclical redundancy check (CRC) or another suitable hash algorithm. The CRC is a hashing algorithm that takes a set of bytes as an input and returns a hash of variable length (in a number of parity bits). It is possible, but unlikely, to have a hash collision where two different data logger configurations generate the same configuration ID. In such a situation, the configuration manager DB 345 can append the data logger configuration to a record associated with the same configuration ID along with a name, version identifier, or other metadata for storage in the configuration manager DB 345. If a configuration is requested by a configuration ID which has more than one configuration associated with it, then the user who requests the offending configuration ID can be prompted for which data logger configuration is desired.

The configuration manager DB 345 may correspond to a cloud server accessible via a network connection. The configuration manager DB 345 maintains information about the various data logger configurations held in the repository 330 and may retrieve data logger configurations from the repository 330 in response to user requests. The configuration manager DB can then push 365 the data logger configurations retrieved to one or more vehicles 370, such as the vehicle 100 of FIG. 1. Pushing the data logger configurations to the one or more vehicles 370 may include, identifying a destination address (e.g., network address) of each of the one or more vehicles 370 and sending the data logger configurations to each of the one or more vehicles 370. As noted above, in some implementations, each of the one or more vehicles 370 can be queried to determine the vehicle status (e.g., in use, not in use, driving, at idle, etc.), and the data logger configurations may only be sent when each of the one or more vehicles 370 are not in use, are at rest, are idle, etc.). When the one or more vehicles 370 cannot yet receive the data logger configurations, the configuration manager DB 345 can periodically retry sending the data logger configurations until the send is successful. In other implementations, the configuration manager DB 345 can send the data logger configurations even when the vehicle is in use and the data logger configurations can be applied at the vehicle, for example by restarting the ADR Logger application, later.

Still referring to the system flow diagram for the system 300 in FIG. 3, a user 350 can request 355 a data logger configuration to be sent to one or more vehicles. The user 350 can request the data logger configuration of interest by its configuration ID. The user 350 can also indicate which vehicle(s) are to receive the data logger configuration of interest. As noted above, if the configuration manager DB 345 indicates that more than one configuration is associated with the requested ID, the configuration manager DB 345 can prompt the user 350 for which configuration is desired by presenting the user 350 with a list of available configurations under that configuration ID. The configuration manager DB 345 may then obtain via the element 360, the requested data logger configuration from the repository 330.

The user 350 may execute other commands as well that can be handled by the configuration manager DB 345. As noted above, the user 350 may request to write a data logger configuration to one or more vehicles. In addition, the user 350 may request to delete a data logger configuration from the one or more vehicles. Also, the user 350 may request the data logger configuration, e.g., the configuration ID, for one or more vehicles.

When the request from the user 350 is to write the data logger configuration, the configuration manager DB 345 may push the requested data logger configuration to one or more vehicles based on the indication of vehicle provided by the user 350, such indication including for example, individual vehicle identifier, location, legal jurisdiction, owner information, and so forth as noted above. When the request from the user 350 is to delete the data logger configuration from one or more vehicles, then the configuration manager DB 345 can send an instruction to the one or more vehicles based on the vehicle indication information to delete the data logger configuration. When the request from the user 350 is to retrieve the data logger configuration from one or more vehicles, then the configuration manager DB 345 can request such information from the one or more vehicles based on the vehicle indication information, and receive in response the configuration ID associated with each of the indicated vehicles.

The process of developing and testing data logger configurations can be performed disjunctive of the process of selecting data logger configurations and pushing the data logger configurations to various vehicles.

Figure 4:
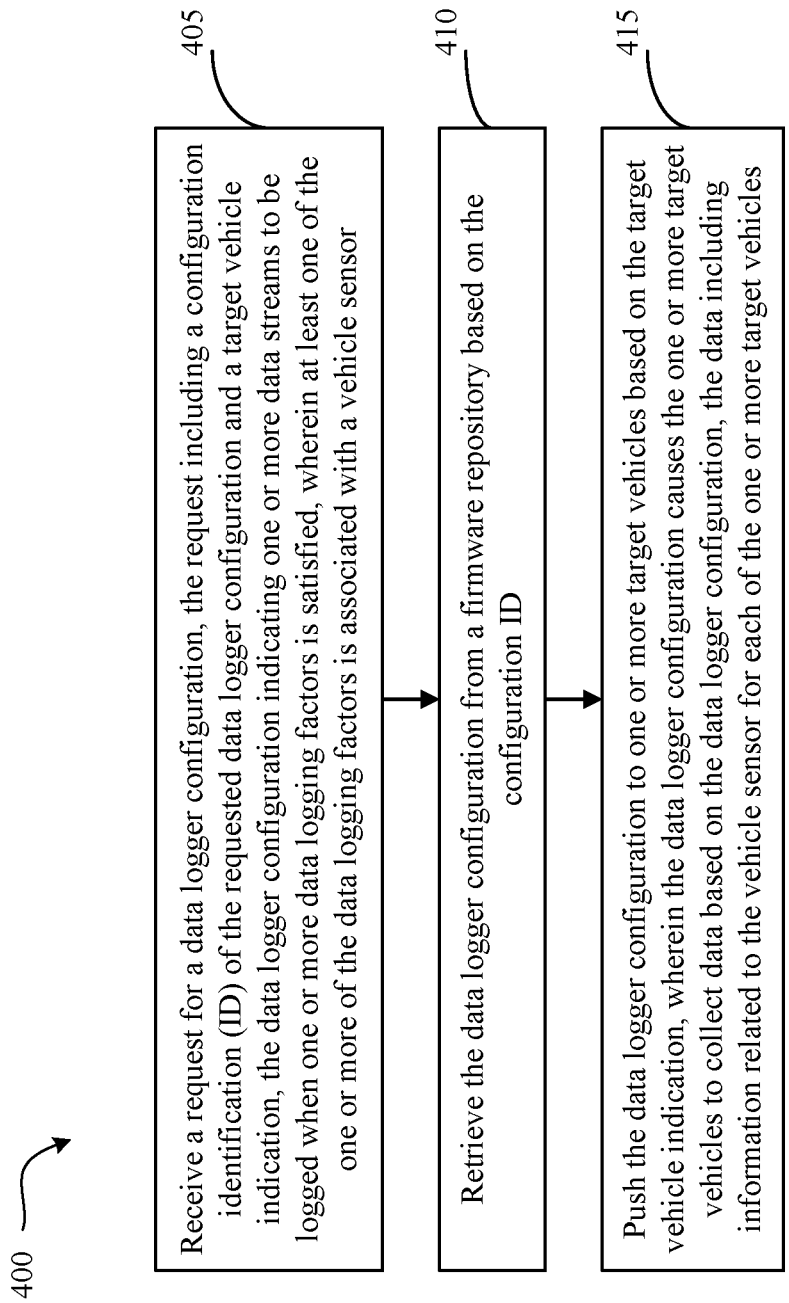
FIG. 4 illustrates a flow diagram of an example process for receiving a request for replacing data logger configuration and pushing the data logger configuration to a vehicle, in accordance with one or more implementations of the subject technology.

FIG. 4 illustrates a flow diagram 400 for receiving a request for a data logger configuration to be sent to one or more vehicles and sending the data logger configuration to the one or more vehicles, in accordance with some implementations. In particular, the flow diagram 400 may be used to manage and utilize a configuration of one or more vehicles for logging data associated with the ADAS. Further, the flow diagram 400 may be implemented by a server associated with a vehicle manufacturer or maintenance provider. For explanatory purposes, the flow diagram 400 is primarily described herein with reference to the configuration manager DB 345 of FIG. 3 and the vehicle 100 of FIG. 1, and/or various components thereof. However, the flow diagram 400 is not limited to the configuration manager DB 345. For example, it should be understood that various elements can be executed on different computer systems, and one or more blocks (or operations) of the flow diagram 400 may be performed by one or more other structural components of the configuration manager DB 345, vehicle 100, and/or of other suitable moveable apparatuses, devices, or systems. Further, for explanatory purposes, some of the blocks of the flow diagram 400 are described herein as occurring in serial, or linearly. However, multiple blocks of the flow diagram 400 may occur in parallel. In addition, the blocks of the flow diagram 400 need not be performed in the order shown and/or one or more blocks of the flow diagram 400 need not be performed and/or can be replaced by other operations.

As shown in FIG. 4, flow diagram 400 may include, at 405, receiving a request for a data logger configuration, the request including a configuration identifier (ID) of the requested data logger configuration and a target vehicle indication, the data logger configuration indicating one or more data streams to be logged when one or more data logging factors are satisfied, where at least one of the one or more of the data logging factors is associated with a vehicle sensor. Such a request for the data logger configuration can come from the user 350 as described with respect to FIG. 3.

As noted above, if the configuration ID matches more than one data logger configuration, then the user can be provided with a list of possible data logger configurations matching the requested configuration ID and prompt the user for which of the data logger configurations is desired. The list of possible data logger configuration can include identifying metadata such as friendly names of such configurations, dates, names, titles, developer names, project names, and so forth.

The target vehicle indication may be an identifier or address of a particular vehicle or a filtering condition for a group of vehicles. For example, the filtering condition may be a geographical area based, for example, on state or country jurisdiction, zip code, geolocation and/or geofenced area; environmental factors such as weather, weather forecast, climate; regulatory conditions, such as governmental jurisdictions under which certain regulations are applied; demographic information of users associated with a vehicle; climate zones of vehicles; model of vehicle; and so forth.

The filtering condition can be applied to a database of vehicles and a list of vehicles and electronic addresses of vehicles can be retrieved.

At 410, the data logger configuration can be retrieved from a repository based on the configuration ID and other identifying metadata (if necessary). Then, at 415, the data logger configuration can be pushed to one or more target vehicles based on the target vehicle indication, where the data logger configuration causes the one or more target vehicles to collect data based on the data logger configuration, where the data includes information related to the vehicle sensor for each of the one or more target vehicles. Pushing the data logger configuration may also include pushing the configuration ID with the data logger configuration, where the pushed data logger configuration does not replace an existing data logger configuration when the configuration ID is the same as configuration ID for the existing data logger configuration. In other words, the vehicle can reject the data logger configuration when the configuration ID matches the configuration ID for the existing data logger configuration which is already installed. As noted above, pushing the data logger configurations to the one or more target vehicles may include, identifying a destination address (e.g., network address) of each of the one or more target vehicles and sending the data logger configuration to each of the one or more target vehicles. In some implementations, each of the one or more target vehicles can be queried to determine the vehicle status (e.g., in use, not in use, driving, at idle, etc.), and the data logger configuration may only be sent when each of the one or more target vehicles are not in use, are at rest, are idle, etc.). When the one or more target vehicles cannot yet receive the data logger configurations, sending the data logger configuration can be retried until the send is successful. In other implementations, the vehicle can receive the data even when the vehicle is in use and the data logger configuration can be applied, for example by restarting the ADR Logger application, later. The data collected by the one or more target vehicles can be received or received by a server associated with the user.

Figure 5:
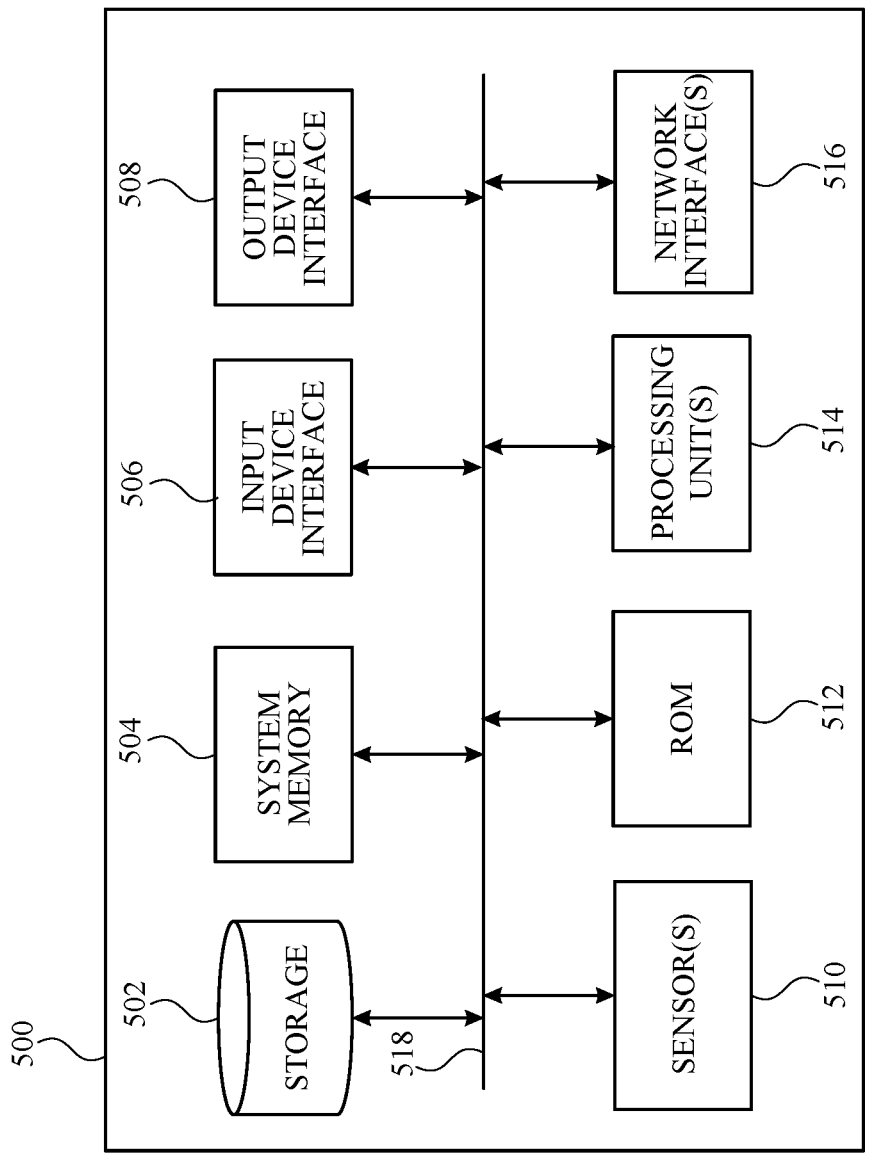
FIG. 5 illustrates an electronic system with which one or more implementations of the subject technology may be implemented.

FIG. 5 illustrates an example electronic system 500 with which aspects of the present disclosure may be implemented. The electronic system 500 can be, and/or can be a part of, any electronic device for providing the features and performing processes described in reference to FIGS. 1-4, including but not limited to a vehicle, computer, and server. The electronic system 500 may include various types of computer-readable media and interfaces for various other types of computer-readable media. The electronic system 500 includes a persistent storage device 502, system memory 504 (and/or buffer), input device interface 506, output device interface 508, sensor(s) 510, ROM 512, processing unit(s) 514, network interface 516, bus 518, and/or subsets and variations thereof. In one or more implementations, the vehicle management system 104 of FIG. 1 is, or includes at least a portion of, the electronic system 500.

The bus 518 collectively represents all system, peripheral, and chipset buses that communicatively connect the numerous internal devices and/or components of the electronic system 500, such as any of the components of the vehicle 100 discussed above with respect to FIG. 1. In one or more implementations, the bus 518 communicatively connects the one or more processing unit(s) 514 with the ROM 512, the system memory 504, and the persistent storage device 502. From these various memory units, the one or more processing unit(s) 514 retrieves instructions to execute and data to process in order to execute the processes of the subject disclosure. The one or more processing unit(s) 514 can be a single processor or a multi-core processor in different implementations. In one or more implementations, one or more of the processing unit(s) 514 may be included on the vehicle management system 104.

The ROM 512 stores static data and instructions that are needed by the one or more processing unit(s) 514 and other modules of the electronic system 500. The persistent storage device 502, on the other hand, may be a read-and-write memory device. The persistent storage device 502 may be a non-volatile memory unit that stores instructions and data even when the electronic system 500 is off. In one or more implementations, a mass-storage device (such as a magnetic or optical disk and its corresponding disk drive) may be used as the persistent storage device 502.

In one or more implementations, a removable storage device (such as a flash drive, and its corresponding disk drive) may be used as the persistent storage device 502. Like the persistent storage device 502, the system memory 504 may be a read-and-write memory device. However, unlike the persistent storage device 502, the system memory 504 may be a volatile read-and-write memory, such as RAM. The system memory 504 may store any of the instructions and data that one or more processing unit(s) 514 may need at runtime. In one or more implementations, the processes of the subject disclosure are stored in the system memory 504, the persistent storage device 502, and/or the ROM 512. From these various memory units, the one or more processing unit(s) 514 retrieves instructions to execute and data to process in order to execute the processes of one or more implementations.

The persistent storage device 502 and/or the system memory 504 may include one or more machine learning models. Machine learning models, such as those described herein, are often used to form predictions, solve problems, recognize objects in image data, and the like. For example, machine learning models described herein may be used to predict semantic information and boundary region information for one or more pixels of an image. Various implementations of the machine learning model are possible. For example, the machine learning model may be a deep learning network, a transformer-based model (or other attention-based models), a multi-layer perceptron or other feed-forward networks, neural networks, and the like. In various examples, machine learning models may be more adaptable as machine learning models may be improved over time by re-training the models as additional data becomes available.

The bus 518 also connects to the input device interfaces 506 and output device interfaces 508. The input device interface 506 enables a user to communicate information and select commands to the electronic system 500. Input devices that may be used with the input device interface 506 may include, for example, alphanumeric keyboards, touch screens, and pointing devices. The output device interface 508 may enable the electronic system 500 to communicate information to users. For example, the output device interface 508 may provide the display of images generated by electronic system 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

The bus 518 also connects to sensor(s) 510. The sensor(s) 510 may include any of the aforementioned sensors, as well as a geo-location sensor, which may be used in determining device position based on positioning technology. For example, the geo-location sensor may provide for one or more of global navigation satellite system (GNSS) positioning, wireless access point positioning, cellular phone signal positioning, Bluetooth signal positioning, image recognition positioning, and/or an inertial navigation system (e.g., via motion sensors such as an accelerometer and/or gyroscope). In one or more implementations, the sensor(s) 510 may be utilized to detect movement, travel, and orientation of the electronic system 500. For example, the sensor(s) may include an accelerometer, a rate gyroscope, and/or other motion-based sensor(s). The sensor(s) 510 may include one or more biometric sensors and/or cameras for authenticating a user.

The bus 518 also couples the electronic system 500 to one or more networks and/or to one or more network nodes through the one or more network interface(s) 516. In this manner, the electronic system 500 can be a part of a network of computers (such as a local area network or a wide area network). Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the present disclosure. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different orders. Some of the steps, operations, or processes may be performed simultaneously. The accompanying method claims, if any, present elements of the various steps, operations, or processes in a sample order, and are not meant to be limited to the specific order or hierarchy presented. These may be performed in serial, linearly, in parallel, or in different order. It should be understood that the described instructions, operations, and systems can generally be integrated together in a single software/hardware product or packaged into multiple software/hardware products.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
receiving, at a first device and from a server, a data logger configuration containing one or more data logging factors that indicates one or more data streams associated with respective vehicle sensors to be logged when corresponding sensor values of the respective vehicle sensors satisfy at least a respective condition to trigger logging the one or more data streams indicated by each of the one or more data logging factors, wherein the data logger configuration comprises an executable script which is periodically executed to determine whether the corresponding sensor values are satisfied and to cause the one or more data streams to be logged;
replacing, at the first device, an existing data logger configuration with the received data logger configuration, wherein replacing the existing data logger configuration with the received data logger configuration alters operation of the first device, the altering changing at least one condition of at least one of the data logging factors;
executing, at the first device, the received data logger configuration to determine that the one or more data logging factors have been satisfied; and
responsive to determining that the one or more data logging factors have been satisfied, logging the one or more data streams.

2. The method of claim 1, wherein the first device is a disposed in a vehicle.

3. The method of claim 2, wherein the data logger configuration is received, at least in part, based on a geographic location of the vehicle, based on a weather condition surrounding the vehicle, or based on a legal jurisdiction of the vehicle.

4. The method of claim 2, wherein replacing the existing data logger configuration with the received data logger configuration is performed when the vehicle is in a parked state without interrupting operation of the vehicle.

5. The method of claim 1, further comprising:
prior to replacing the existing data logger configuration with the received data logger configuration, comparing a first configuration identifier (ID) of the existing data logger configuration to a second configuration identifier (ID) of the received data logger configuration; and
when the second configuration ID is different than the first configuration ID, continue with replacing the existing data logger configuration with the received data logger configuration.

6. The method of claim 5, wherein the first configuration ID comprises a hash of the existing data logger configuration, wherein the second configuration ID comprises a hash of the received data logger configuration.

7. The method of claim 1, wherein at least one of the one or more data streams include an output of a vehicle sensor.

8. The method of claim 1, further comprising: sending, from the first device to a second server, information including the one or more data streams.

9. The method of claim 1, wherein the existing data logger configuration includes a first data logging factor, wherein the received data logger configuration does not include the first data logging factor, and wherein after replacing the existing data logger configuration, the one or more data streams does not include data related to the first data logging factor.

10. The method of claim 1, wherein the received data logger configuration includes a first data logging factor, wherein the existing data logger configuration does not include the first data logging factor, and wherein after replacing the existing data logger configuration, the one or more data streams includes data related to the first data logging factor, wherein prior to replacing the existing data logger configuration, the one or more data streams did not include data related to the first data logging factor.

11. The method of claim 1, wherein the one or more data logging factors is related to energy consumption, energy efficiency, or vehicle battery usage.

12. A system comprising:
a non-transitory computer-readable memory; and
at least one processor coupled to the memory, the at least one processor configured to:
receive, at a first device and from a server, a data logger configuration containing one or more data logging factors that indicates one or more data streams associated with respective vehicle sensors to be logged when corresponding sensor values of the respective vehicle sensors satisfy at least a respective condition to trigger logging the one or more data streams indicated by each of the one or more data logging factors, wherein the data logger configuration comprises an executable script which is periodically executed to determine whether the corresponding sensor values are satisfied and to cause the one or more data streams to be logged;
replace, at the first device, an existing data logger configuration with the received data logger configuration, wherein replacing the existing data logger configuration with the received data logger configuration alters operation of the first device, the altering changing at least one condition of at least one of the data logging factors;
execute the received data logger configuration to determine, at the first device, that the one or more data logging factors have been satisfied; and
responsive to determining that the one or more data logging factors have been satisfied, log the one or more data streams.

13. The system of claim 12,
wherein the existing data logger configuration includes a first data logging factor, wherein the received data logger configuration does not include the first data logging factor, and wherein after replacing the existing data logger configuration, the one or more data streams does not include data related to the first data logging factor; or
wherein the received data logger configuration includes a second data logging factor, wherein the existing data logger configuration does not include the second data logging factor, and wherein after replacing the existing data logger configuration, the one or more data streams includes data related to the second data logging factor, wherein prior to replacing the existing data logger configuration, the one or more data streams did not include data related to the second data logging factor; or
wherein the first data logging factor or the second data logging factor is related to energy consumption, energy efficiency, or vehicle battery usage.

14. A method comprising:
receiving a request for a data logger configuration, the request including a configuration identifier (ID) of the requested data logger configuration and a target vehicle indication, the data logger configuration indicating one or more data streams associated with respective vehicle sensors to be logged when corresponding sensor values of the respective vehicle sensors satisfy at least a respective condition to trigger logging the one or more data streams indicated by each of one or more data logging factors, wherein at least one of the one or more of the data logging factors is associated with a vehicle sensor;
retrieving the data logger configuration from a firmware repository based on the configuration ID; and
pushing the data logger configuration to one or more target vehicles based on the target vehicle indication, wherein the data logger configuration comprises an executable script which when executed causes the one or more target vehicles to collect data based on the data logger configuration and that the corresponding sensor values satisfy the respective condition to cause the one or more data streams to be logged, the data including information related to the vehicle sensor for each of the one or more target vehicles.

15. The method of claim 14, further comprising:
filtering a list of target vehicles; and
pushing the data logger configuration to the filtered list of target vehicles.

16. The method of claim 15, wherein the list of target vehicles is filtered by geographic location of each vehicle, a weather condition surrounding each vehicle, or a legal jurisdiction of each vehicle.

17. The method of claim 14, wherein following the data logger configuration being tested at a testing simulator, the data logger configuration is stored as valid in the firmware repository, further comprising:
receiving the configuration ID from the firmware repository.

18. The method of claim 17, wherein the testing simulator tests each of the data logging factors of the one or more data logging factors in the data logger configuration.

19. The method of claim 14, wherein the configuration ID is calculated as a hash of the data logger configuration, wherein when the configuration ID is already stored in the firmware repository, the data logger configuration is appended to a record associated with the configuration ID.

20. The method of claim 19, further comprising:
when the record associated with the configuration ID contains multiple data logger configurations, prompting for an input indicating which data logger configuration is requested;
receiving the input indicating which data logger configuration is requested; and
ignoring other data logger configurations in the record associated with the configuration ID which were not requested.

* * * * *